United States Patent [19]
Zwayer

[11] Patent Number: 5,740,976
[45] Date of Patent: Apr. 21, 1998

[54] ONE-PIECE FISHING REEL SUBASSEMBLY

[75] Inventor: Kent Zwayer, Tulsa, Okla.

[73] Assignee: Zebco Division of Brunswick Corporation, Tulsa, Okla.

[21] Appl. No.: 309,664

[22] Filed: Sep. 21, 1994

[51] Int. Cl.$^6$ .................................................. A01K 89/01
[52] U.S. Cl. ................................................... 242/311
[58] Field of Search .............................. 242/310, 311, 242/312, 313, 314, 315

[56] References Cited

U.S. PATENT DOCUMENTS

| | | | |
|---|---|---|---|
| 3,296,731 | 1/1967 | Wood | 242/311 X |
| 3,788,570 | 1/1974 | Yamazaki et al. | 242/312 X |
| 4,208,020 | 6/1980 | Gifford | |
| 4,408,729 | 10/1983 | Moss et al. | 242/311 X |
| 4,512,531 | 4/1985 | Tunoda | 242/311 X |
| 4,722,491 | 2/1988 | Myojo | 242/311 |
| 5,308,017 | 5/1994 | Yoshikawa | 242/311 X |
| 5,377,924 | 1/1995 | Takeuchi | 242/311 X |

FOREIGN PATENT DOCUMENTS

| | | |
|---|---|---|
| 606030 | 8/1948 | United Kingdom . |
| 2261354 | 5/1993 | United Kingdom . |
| 2263380 | 7/1993 | United Kingdom . |
| 2285379 | 7/1995 | United Kingdom . |

*Primary Examiner*—Daniel P. Stodola
*Assistant Examiner*—William A. Rivera
*Attorney, Agent, or Firm*—Wood, Phillips, VanSanten, Clark & Mortimer

[57] ABSTRACT

A fishing reel having a front and rear, a top and bottom, and laterally spaced sides. The fishing reel has a deck plate with a forwardly facing surface and an opening extending in a fore and aft direction. A reel operating mechanism is provided, with there being first structure for mounting at least a portion of the reel operating mechanism to the deck plate. A housing encases at least a portion of the reel operating mechanism and has laterally oppositely facing side walls and a rear wall. Second structure is provided for mounting the housing with the operating mechanism thereon to a fishing rod. A one-piece subassembly defines at least a part of each of a) the deck plate, b) one of the side walls, and c) the rear wall, with there being a rearwardly facing, undercut surface in the deck plate part on the subassembly extending around the deck plate opening.

14 Claims, 3 Drawing Sheets

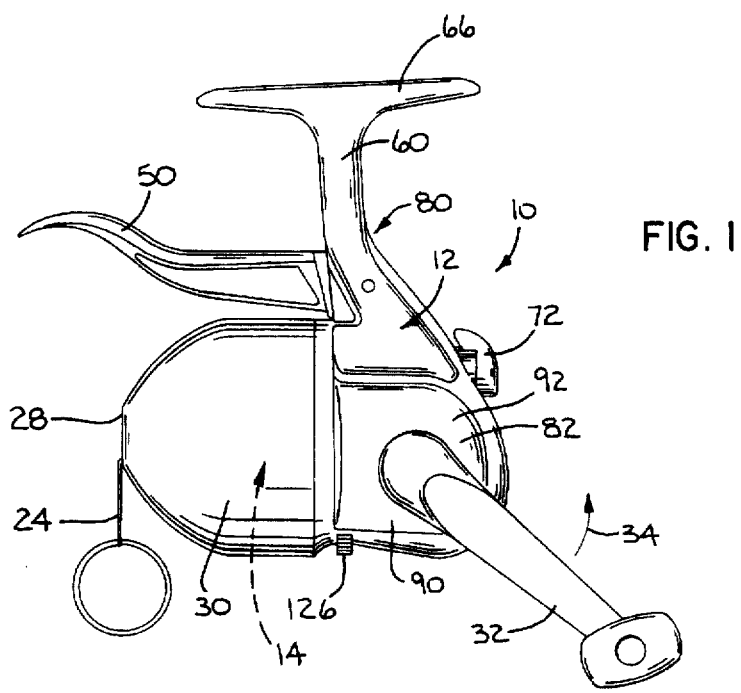
FIG. 1
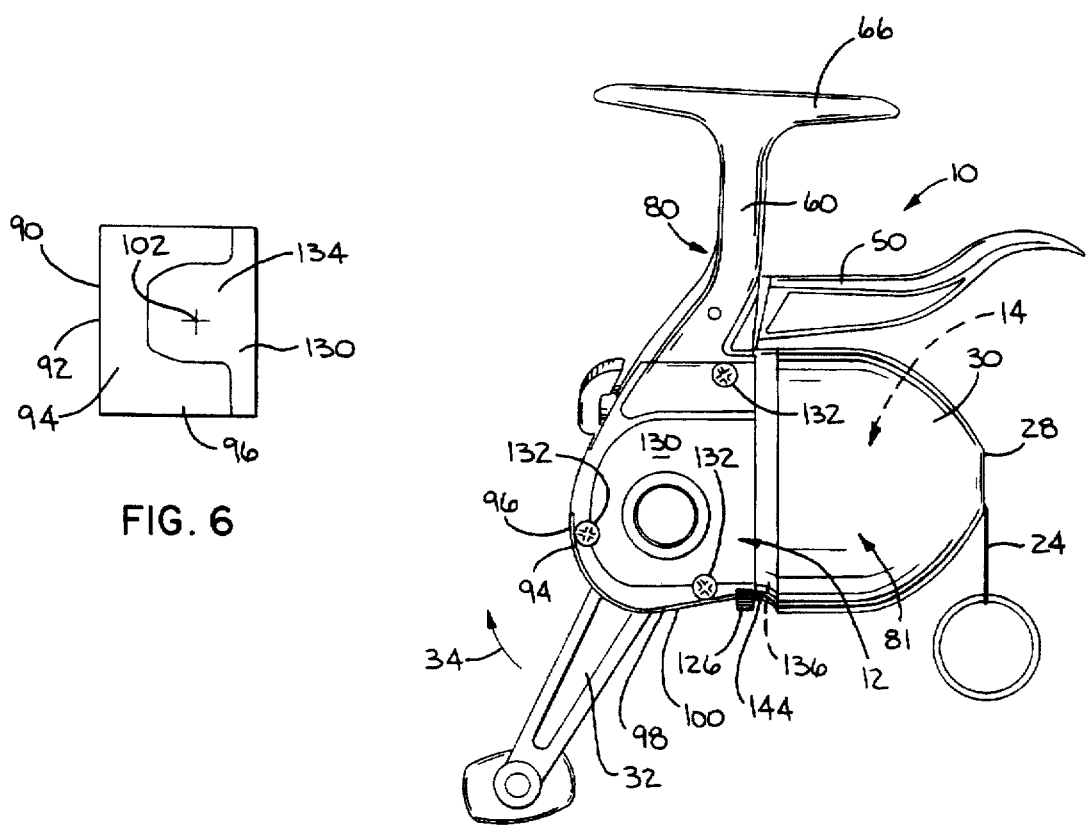
FIG. 6
FIG. 2

ONE-PIECE FISHING REEL SUBASSEMBLY

BACKGROUND OF THE INVENTION

1. Field of the Invention

This invention relates to fishing reels and, more particularly, to a fishing reel having a one-piece subassembly that defines a) a foundation for at least part of an operating mechanism for the fishing reel, b) a structure for mounting the subassembly to a fishing rod, and c) a bored undercut in the deck plate, as to receive a ball bearing.

2. Background Art

To keep fishing reel manufacturing costs low, it is desirable to minimize the number of parts that must be fabricated and assembled.

It is known to injection mold and die cast parts of fishing reels so that certain parts perform more than one function. For example, it is known to form a deck plate, on which operating components of the reel are mounted, as one piece with a mounting stem and foot for the reel. One such construction is shown in U.S. Pat. No. 5,199,665, to Tipton. Because the front and rear covers of the Tipton reel are separable from the deck plate, the front and rear of the deck plate are accessible, as to be bored to define a seat for a roller bearing or the like.

It is also known to form as one piece with the deck plate a portion of the outer housing for the reel. While existing injection molding and die cast techniques permit the molding as one piece of a side and rear wall of the housing, the rear wall obstructs access to the deck plate from the rear thereof by a conventional line boring tool, as used to define a counterbore to define a seat for an element such as a roller bearing.

Because of this, some manufacturers have constructed a one-piece subassembly so that the boring step is eliminated. This necessitates the formation of additional parts, such as bushings, which can be press fit into a molded bore in the deck plate from the rear thereof. This results in a functionally equivalent structure to that which is formed by a drilled undercut, but requires the use of additional parts and performance of additional assembly steps.

SUMMARY OF THE INVENTION

The present invention is specifically directed to overcoming the above problem in a novel and simple manner.

In one form of the invention, a fishing reel is provided having a front and rear, a top and bottom, and laterally spaced sides. The fishing reel has a deck plate with a forwardly facing surface and an opening extending in a fore and aft direction. A reel operating mechanism is provided, with there being first structure for mounting at least a portion of the reel operating mechanism to the deck plate. A housing encases at least a portion of the reel operating mechanism and has laterally oppositely facing side walls and a rear wall. Second structure is provided for mounting the housing with the operating mechanism thereon to a fishing rod. A one-piece subassembly defines at least a part of each of a) the deck plate, b) one of the side walls, and c) the rear wall, with there being a rearwardly facing, undercut surface in the deck plate part on the subassembly extending around the deck plate opening.

In one form, the operating mechanism includes a shaft which extends fully through the deck plate opening, with the deck plate having a rearwardly facing surface with a counterbore defining the undercut surface. A bearing for the shaft can be placed in the counterbore in the rearwardly facing deck plate surface.

The one-piece subassembly can be defined by injection molding, a die cast process, or by any other suitable process known to those in the art.

In one form, the one-piece subassembly defines at least part of the second structure for mounting the housing to a fishing rod.

In one form, the deck plate opening extends fully through the deck plate and has an axis and the at least part of the rear wall has an opening therethrough through which the axis of the deck plate opening passes.

The one-piece subassembly can be bored to define the undercut surface.

In one form, the second structure includes a mounting stem and a mounting foot and the one-piece subassembly defines both the mounting stem and mounting foot.

In another form, there is an annular rim on the deck plate, with the housing including a front cover that is removably connected to the annular rim. The one-piece subassembly defines at least a portion of the annular rim.

In another form, at least part of the rear wall has an opening therethrough and there is a removable cover that is joinable to the one-piece subassembly. The removable cover defines at least a part of the other of the side walls and has a tab for blocking the rear wall opening with the cover joined to the one-piece subassembly.

While the invention could be incorporated into a number of different styles of fishing reels, in an exemplary form it is incorporated into a spincast-type reel having an operating mechanism including a rotatable spinner head, with the spinner head mounted to the shaft for rotation therewith.

In another form of the invention, a one-piece fishing reel subassembly is provided and has a deck plate with a forwardly facing surface to which at least a portion of a reel operating mechanism can be attached, a first wall having a first laterally facing surface that is exposed at one side of the one-piece subassembly, a second wall having a rearwardly facing surface at the rear of the one-piece subassembly, with the first and second walls bounding a receptacle for a portion of a reel operating mechanism, and structure for attaching the one-piece subassembly to a fishing rod.

The structure for attaching the subassembly may include a mounting stem or both a mounting stem and a mounting foot.

A removable cover can be provided with a third wall having a third laterally facing surface that is exposed at the other side of the one-piece subassembly.

The second wall may have an opening therethrough, with the removable cover having a tab that blocks the second wall opening with the cover joined to the one-piece subassembly.

The deck plate may have a counterbore defining a rearwardly facing, undercut surface around the through opening in the deck plate.

The cover and the one-piece subassembly can cooperatively define an annular rim to cooperate with a rear rim on a cup-shaped front cover. The annular and rear rims fit one within the other to maintain the front cover operatively on the one-piece subassembly.

The one-piece subassembly may include a forwardly projecting cylindrical hub to mount a line-carrying spool.

BRIEF DESCRIPTION OF THE DRAWINGS

FIG. 1 is a side elevation view of a fishing reel incorporating the present invention;

FIG. 2 is an enlarged, side elevation view of the fishing reel in FIG. 1, taken from the side opposite that of FIG. 1.

FIG. 6 is an enlarged, fragmentary, end elevation view of the rear wall of the fishing reel in FIG. 1.

DETAILED DESCRIPTION OF THE DRAWINGS

Figure 3:
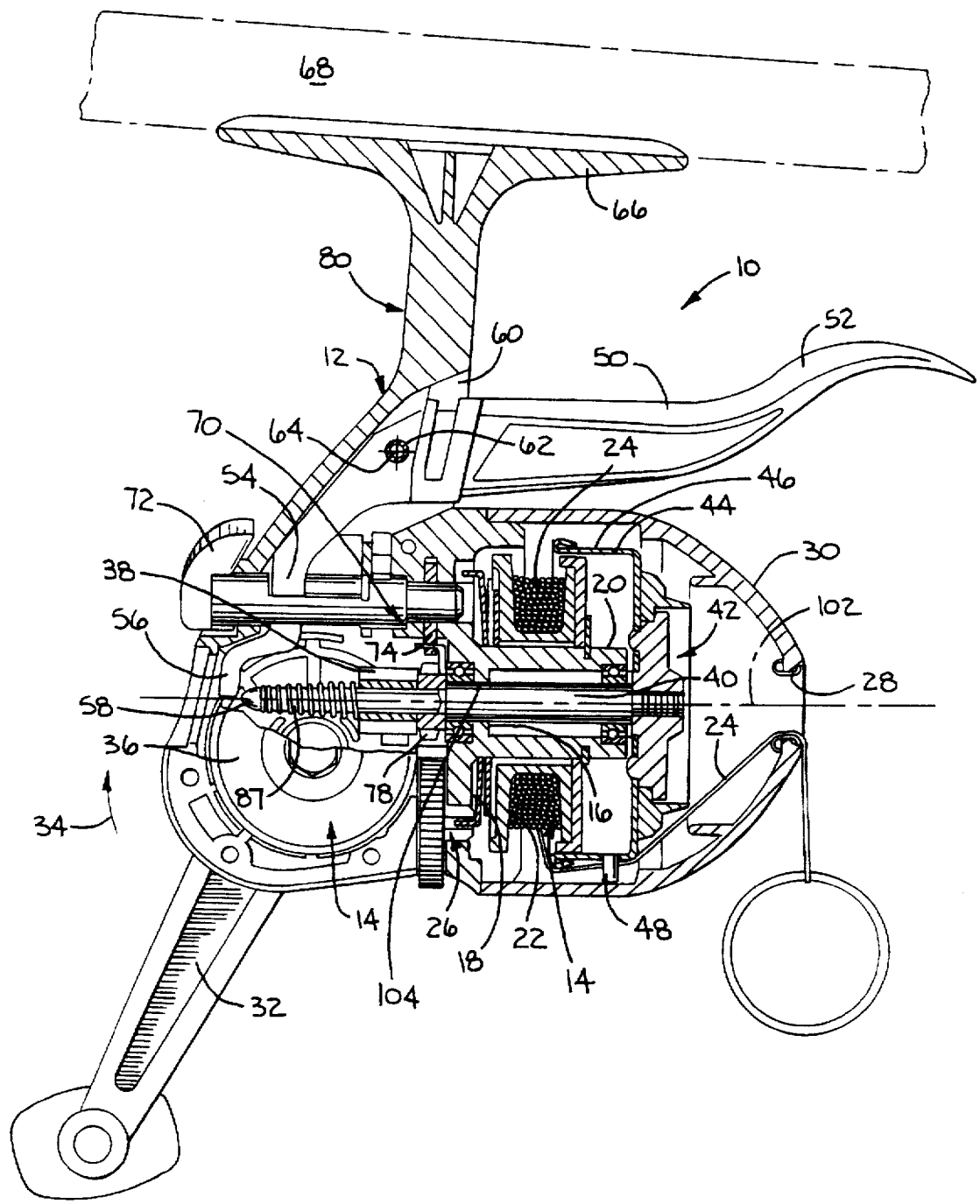
FIG. 3 is an enlarged, cross-sectional view of the fishing reel in FIG. 1 taken in vertical section.

In FIGS. 1–3, a spincast-type fishing reel is shown at 10 with the present invention incorporated therein. The fishing reel 10 is intended only to be exemplary of one type of reel construction into which the present invention can be incorporated. Consequently, the configuration of the fishing reel 10 should not be viewed as limiting.

The fishing reel 10 is sold by the assignee herein under the mark TRIGGERSPIN™. Briefly, the reel 10 has a body 12 which defines a foundation upon which components of an operating mechanism at 14 are mounted. The reel body 12 includes a deck plate 16 with a forwardly facing surface 18 thereon. An annular hub 20 projects forwardly of the surface 18 and defines a support for a spool 22, which retains a supply of line 24.

The spool 22 is rotatable relative to the hub 20. Rotation of the spool 22 is resisted by a variable force drag system at 26. The operation of the drag system 26 is peripheral to the present invention. A suitable drag system is described in detail in U.S. Pat. No. 5,199,665, which is incorporated herein by reference. It suffices to say that the drag system 26 determines the torque at which the spool 22 will slip and rotate relative to the hub 20. This torque is developed by drawing on the line 24 projecting through a forward opening 28 in a cup-shaped, front cover 30 with the operating mechanism 14 in a retrieve state.

Line 24 is retrieved on the reel 10 by operating a crank handle 32. The crank handle 32, upon being rotated in the direction of the arrow 34, drives a face gear 36 which is in mesh with a pinion gear 38 carried on a center shaft 40.

The center shaft 40 carries a spinner head assembly 42 at its forward end for rotation with the shaft 40. The details of the spinner head assembly 42 are likewise peripheral to the present invention. A suitable spinner head assembly 42 is also described in detail in U.S. Pat. No. 5,199,665.

Briefly, the spinner head assembly 42 includes a cup-shaped spinner head 44 with an outer annular surface 46. A pickup pin 48 projects radially through the spinner head 44 and away from the surface 46. Line 24 extending from the spool 22 is bent inwardly around the spinner head 44 to allow it to pass through the line opening 28. Through this arrangement, the line 24 is maintained at all times within the path of the pickup pin 48.

Through an actuator/trigger 50, the reel 10 is changed from its retrieve state, shown in FIG. 3, to its casting state. The trigger 50 has a graspable, forwardly projecting leg 52 and a transverse leg 54 depending from the leg 52. The depending leg 54 has a free end 56 that is abuttable to the free end 58 of the center shaft 40.

The trigger 50 is connected to a mounting stem 60 through a pin 62 for pivoting movement relative to the stem 60 about a laterally extending axis 64.

With a mounting foot 66 on the mounting stem 60 abutted to a rod 68 in conventional fashion, the user can grasp the mounting stem 60 and foot 66 with one hand and, with fingers on that same hand, grasp underneath the trigger 50 and draw the trigger 50 upwardly so that it pivots about its midportion to thereby press the center shaft 40 forwardly. Through the mechanism 14, the pickup pin 48 is retracted. This allows the line 24 on the spool 22 to pay freely out through the opening 28. The operating mechanism 14 is returned to the retrieve state by operating the crank handle 32.

Reverse rotation of the shaft 40 is prevented by a selectively operable anti-reverse mechanism at 70. The reel could be operated without an anti-reverse mechanism according to the present invention and thus discussion of the details of the mechanism 70 are omitted herefrom. It suffices to say that with the anti-reverse mechanism 70 in an "on" position, which is effected through an actuating switch 72, a pawl 74 engages with a ratchet wheel 78 on the shaft 40 to prevent reverse rotation of the shaft 40. With the switch 72 operated to place the anti-reverse mechanism 70 in an "off" position, the pawl 74 is moved out of the path of the ratchet wheel 78 so that the shaft 40 can rotate freely in a reverse direction.

According to the invention, a one-piece subassembly, at 80 in each of FIGS. 1–6, is used to construct the fishing reel 10. The one-piece subassembly 80 is preferably constructed from plastic using a die cast or injection molding process. According to the invention, the deck plate 16, mounting stem 60, mounting foot 66, and a portion of the reel housing at 81, which encases part of the operating mechanism 14, are formed as one piece. The one-piece subassembly 80 defines a rear housing portion 82 which defines an interior receptacle at 84 for the face gear 36, rear end 87 of the center shaft 40, the pinion gear 38, and parts of the anti-reverse mechanism at 70 and drag system at 26.

The rear housing portion 82 has a first wall 90 with a surface 92 exposed at one side of the housing 81. The rear housing portion 82 has a second wall 94 having a surface 96 exposed at the rear of the housing part 82. The second wall 94 blends into a third wall 98, which has an exposed surface 100 facing downwardly.

By forming the subassembly 80 as one piece, the rear housing wall 94, if uninterrupted, would intersect the rotational axis 102 of the shaft 40. Consequently, while a stepped bore 104 could be formed through the hub 20 through the conventional die cast and/or injection molding processes and using a separate bushing, it would not be possible, without modification of the wall 94, to direct a line boring tool into the deck plate 16, as to form a counterbore 106 and bounding rearwardly facing annular surface 110 in the deck plate 16, as to accept a rear roller bearing 111.

According to the invention, the rear wall 94 has a cut-out/opening 112 to permit access by a line boring tool. Thus the counterbore 106 and surface 110 can be formed by a secondary operation after the die cast/injection molding formation of the one-piece subassembly 80. The cut-out/opening 112 must accordingly have an effective diameter at least equal to the effective diameter of the counterbore 106.

Figure 4:
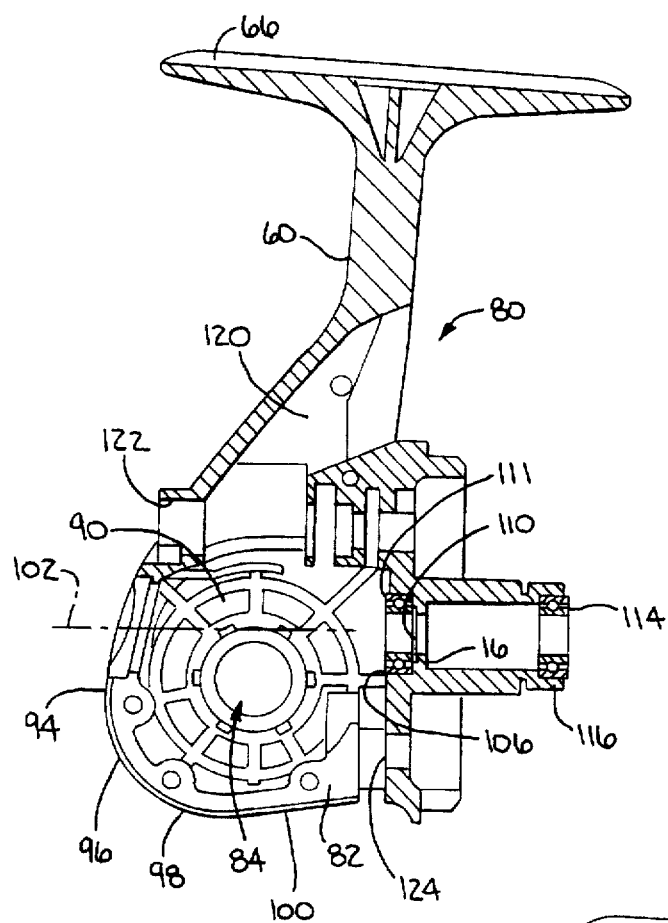
FIG. 4 is an enlarged, side elevation view of a one-piece subassembly, according to the present invention, that defines part of the fishing reel in FIGS. 1–3.
Figure 5:
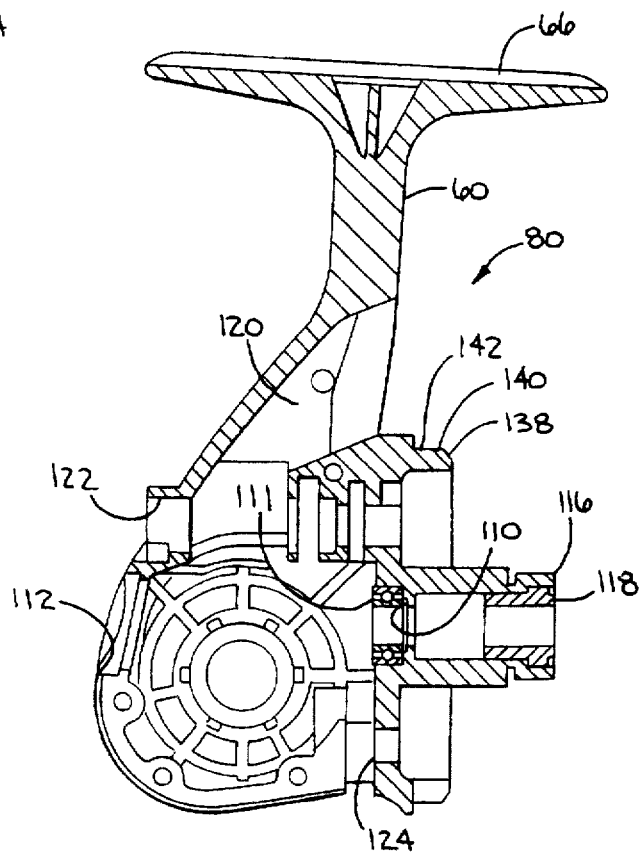
FIG. 5 is a view as in FIG. 4 of a modified form of a one-piece subassembly.

A forward roller bearing 114 is shown on the subassembly 80 in FIG. 4 with there being a mounting ring 116 to hold the bearing 114 in an operative position. This forward bearing 114 might be eliminated, as shown on the subassembly 80 in FIG. 5, by the provision of a bushing 118 in place thereof, which bushing 118 is likewise held in place by the ring 116.

The one-piece subassembly 80 also defines an undercut seat 120 for the trigger 50, a receptacle 122 for the switch 72 and a receptacle 124 for a drag actuating wheel 126.

The main receptacle 84 defined by the rear housing part 82 is closed by a separate cover 130, which is held in place on the rear housing part 82 by screws 132. The cover 130 has a tab 134 that wraps around the rear of the housing part 82 and blocks the cut-out/opening 112.

The cover 130 has a rim portion 136 which cooperates with a rim portion 138 on the housing part 82 so that the rim portions 136, 138 cooperatively define an annular rim assembly 140 with an outer surface 142 that is closely, frictionally surrounded by the rear, annular edge 144 on the cup-shaped front cover 30.

With the inventive structure, the rear housing pan 82 can be formed using conventional die cast and injection molding processes, after which a secondary line boring operation can be performed to complete the subassembly 80. This obviates the need for additional die cast parts that might be required to be press fit into the deck plate 16 as to produce the equivalent to the undercut surface 110.

The foregoing disclosure of specific embodiments is intended to be illustrative of the broad concepts comprehended by the invention.

I claim:

1. A fishing reel having a front and rear, a top and bottom, and laterally spaced sides, said fishing reel comprising:

a deck plate having a forwardly facing surface and an opening therein extending in a fore and aft direction;

a reel operating mechanism;

first means for mounting at least a portion of the reel operating mechanism to the deck plate;

a housing for encasing at least a portion of the reel operating mechanism and having laterally oppositely facing side walls and a rear wall; and second means for mounting the housing with the operating mechanism thereon to a fishing rod, wherein there is a one-piece subassembly that defines at least a part of each of a) the deck plate, b) one of the side walls, and c) the rear wall, the at least part of the deck plate extending substantially fully around the deck plate opening, there further being a rearwardly facing undercut surface on the at least part of the deck plate defined by the subassembly, the rearwardly facing undercut surface extending around the deck plate opening, wherein the operating mechanism includes a shaft which extends fully through the deck plate opening, the deck plate has a rearwardly facing surface with a counterbore defining the undercut surface and there is a bearing for the shaft in the counterbore in the rearwardly facing deck plate surface.

2. The fishing reel according to claim 1 wherein the shaft is rotatable within the deck plate opening, the operating mechanism includes a rotatable spinner head and the spinner head is mounted to the shaft for rotation therewith.

3. A fishing reel having a front and rear, a top and bottom, and laterally spaced sides, said fishing reel comprising:

a deck plate having a forwardly facing surface and an opening therein extending in a fore and aft direction;

a reel operating mechanism;

first means for mounting at least a portion of the reel operating mechanism to the deck plate;

a housing for encasing at least a portion of the reel operating mechanism and having laterally oppositely facing side walls and a rear wall defining an interior receptacle; and second means for mounting the housing with the operating mechanism thereon to a fishing rod, wherein there is a one-piece subassembly that defines at least a part of each of a) the deck plate, b) one of the side walls, and c) the rear wall, there further being a rearwardly facing undercut surface on the at least part of the deck plate defined by the subassembly, the rearwardly facing undercut surface extending around the deck plate opening and having an effective diameter, the deck plate opening extending fully through the deck plate and having an axis, the at least part of the rear wall having an opening therethrough in direct communication with the interior receptacle through which the axis of the deck plate opening passes, the rear wall opening having an effective diameter at least equal to the effective diameter of the rearwardly facing undercut surface to allow a boring tool to be directed through the rear wall opening to against the at least part of the deck plate to form the undercut surface.

4. A fishing reel having a front and rear, a top and bottom, and laterally spaced sides, said fishing reel comprising:

a deck plate having a forwardly facing surface and an opening therein extending in a fore and aft direction;

a reel operating mechanism;

first means for mounting at least a portion of the reel operating mechanism to the deck plate;

a housing for encasing at least a portion of the reel operating mechanism and having laterally oppositely facing side walls and a rear wall; and second means for mounting the housing with the operating mechanism thereon to a fishing rod, wherein there is a one-piece subassembly that defines at least a part of each of a) the deck plate, b) one of the side walls, and c) the rear wall, there further being a rearwardly facing undercut surface on the at least part of the deck plate defined by the subassembly, the rearwardly facing undercut surface extending around the deck plate opening, wherein there is an annular rim on the deck plate, the housing includes a front cover that is removably connected to the annular rim and the one-piece subassembly defines at least a portion of the annular rim.

5. A fishing reel having a front and rear, a top and bottom, and laterally spaced sides, said fishing reel comprising:

a deck plate having a forwardly facing surface and an opening therein extending in a fore and aft direction;

a reel operating mechanism;

first means for mounting at least a portion of the reel operating mechanism to the deck plate;

a housing for encasing at least a portion of the reel operating mechanism and having laterally oppositely facing side walls and a rear wall; and second means for mounting the housing with the operating mechanism thereon to a fishing rod, wherein there is a one-piece subassembly that defines at least a part of each of a) the deck plate, b) one of the side walls, and c) the rear wall, there further being a rearwardly facing undercut surface on the at least part of the deck plate defined by the subassembly, the rearwardly facing undercut surface extending around the deck plate opening, wherein the at least part of the rear wall has an opening therethrough, and there is a removable cover that is joinable to the one-piece subassembly, defines at least a part of the other of the side walls, and has a tab for blocking the rear wall opening with the cover joined to the one-piece subassembly.

6. A fishing reel having a front and rear, a top and bottom, and laterally spaced sides, said fishing reel comprising:

a reel operating mechanism;

a one-piece subassembly, including a) a deck plate having a forwardly facing surface to which at least a portion of the reel operating mechanism is attached, a rearwardly facing surface with a rearwardly facing undercut surface formed therein, and an opening therethrough having an axis, b) a first wall having a first laterally facing surface that is exposed at one side of the one-piece subassembly, and c) a second wall having a second rearwardly facing surface at the rear of the one-piece subassembly, said first and second walls bounding a receptacle for a portion of a reel operating mechanism; and means for attaching the one-piece subassembly to a fishing rod, wherein the rearwardly facing undercut surface has an effective diameter, and the second wall has an opening formed therethrough in direct communication with the receptacle, the axis of the deck plate opening passing through the second wall opening and the second wall opening having an effective diameter at least as equal to the effective diameter of the rearwardly facing undercut surface to allow a boring tool to be directed through the rear wall opening to against the at least part of the deck plate to form the undercut surface.

7. The fishing reel according to claim 6 wherein the means for attaching the one-piece subassembly comprises a mounting stem.

8. The fishing reel according to claim 6 wherein the means for attaching the one-piece subassembly comprises a mounting stem and a mounting foot on the mounting stem.

9. The fishing reel according to claim 6 wherein the one-piece subassembly is formed by one of a) an injection molding process and b) a die cast process.

10. The fishing reel according to claim 6 in combination with a cover that is removably joinable to the one-piece subassembly, said cover having a third wall having a third laterally facing surface that is exposed at the other side of the one-piece subassembly.

11. The fishing reel according to claim 10 wherein the one-piece subassembly includes a forwardly projecting cylindrical hub to mount a line carrying spool.

12. A one-piece fishing reel subassembly having a front and rear, a top and bottom, and laterally spaced sides, said fishing reel subassembly comprising:

a deck plate having a forwardly facing surface;

a first wall having a first laterally facing surface that is exposed at one side of the one-piece subassembly;

a second wall having a second rearwardly facing surface at the rear of the one-piece subassembly;

said first and second walls bounding a receptacle for a portion of a reel operating mechanism;

means for attaching the one-piece subassembly to a fishing rod; and a cover that is removably joinable to the one-piece subassembly, said cover having a third wall having a third laterally facing surface that is exposed at the other side of the one-piece subassembly, wherein the second wall has an opening extending therethrough and the cover has a tab that blocks the second wall opening with the cover joined to the one-piece subassembly.

13. A one-piece fishing reel subassembly having a front and rear, a top and bottom, and laterally spaced sides, said fishing reel subassembly comprising:

a deck plate having a forwardly facing surface to which at least a portion of a reel operating mechanism can be attached;

a first wall having a first laterally facing surface that is exposed at one side of the one-piece subassembly;

a second wall having a second rearwardly facing surface at the rear of the one-piece subassembly, said first and second walls bounding a receptacle for a portion of a reel operating mechanism; and means for attaching the one-piece subassembly to a fishing rod, wherein the deck plate has a through opening with an axis extending in a fore and aft direction and a rearwardly facing undercut surface therein having an effective diameter, wherein the second wall has an opening therethrough in direct communication with the receptacle, and the axis of the deck plate opening extends through the second wall opening, the second wall opening having an effective diameter at least equal to the effective diameter of the rearwardly facing undercut surface to allow a boring tool to be directed through the rear wall opening to against the at least part of the deck plate to define the undercut surface, wherein the deck plate has a counterbore defining the rearwardly facing, undercut surface.

14. A one-piece fishing reel subassembly having a front and rear, a top and bottom, and laterally spaced sides, said fishing reel subassembly comprising:

a deck plate having a forwardly facing surface to which at least a portion of a reel operating mechanism can be attached;

a first wall having a first laterally facing surface that is exposed at one side of the one-piece subassembly;

a second wall having a second rearwardly facing surface at the rear of the one-piece subassembly;

said first and second walls bounding a receptacle for a portion of a reel operating mechanism; and means for attaching the one-piece subassembly to a fishing rod, in combination with a cover that is removably joinable to the one-piece subassembly, said cover having a third wall having a third laterally facing surface that is exposed at the other side of the one-piece subassembly, wherein the cover and the one-piece subassembly cooperatively define an annular rim, there further being a cup-shaped front cover with a rear rim and the annular and rear rims fit one within the other to maintain the front cover operatively on the one-piece subassembly.

\* \* \* \* \*